(12) United States Patent
Lehmann, Jr.

(10) Patent No.: US 7,494,524 B1
(45) Date of Patent: Feb. 24, 2009

(54) METHOD AND APPARATUS FOR MAINTAINING A DESIRED AIR PRESSURE IN A HOME

(76) Inventor: Erwin Lehmann, Jr., 1008 Beckett, San Antonio, TX (US) 78213

( * ) Notice: Subject to any disclaimer, the term of this patent is extended or adjusted under 35 U.S.C. 154(b) by 568 days.

(21) Appl. No.: 11/161,696

(22) Filed: Aug. 12, 2005

Related U.S. Application Data

(60) Provisional application No. 60/601,908, filed on Aug. 16, 2004.

(51) Int. Cl.
*B01D 50/00* (2006.01)
(52) U.S. Cl. .......... 55/385.2; 96/224; 96/421; 454/238; 454/239
(58) Field of Classification Search .......... 55/385.2; 96/417, 421, 223, 224; 454/238, 239
See application file for complete search history.

(56) References Cited

U.S. PATENT DOCUMENTS

| | | | |
|---|---|---|---|
| 3,862,416 A | 1/1975 | Phillips et al. | |
| 4,483,273 A | 11/1984 | Develle et al. | |
| 4,850,264 A | 7/1989 | Kiser | |
| 4,960,041 A | 10/1990 | Kiser | |
| 4,995,307 A | 2/1991 | Floyd | |
| 5,257,736 A * | 11/1993 | Roy | 236/49.3 |
| 5,564,626 A * | 10/1996 | Kettler et al. | 236/49.3 |
| 5,987,908 A | 11/1999 | Wetzel | |
| 6,283,851 B1 | 9/2001 | Smith et al. | |
| 6,619,063 B1 | 9/2003 | Brumett | |
| 6,833,122 B2 * | 12/2004 | Reisfeld | 422/186.3 |

FOREIGN PATENT DOCUMENTS

| | | | | |
|---|---|---|---|---|
| JP | 57137272 | 59027140 | 2/1984 | |
| JP | | 63180030 A * | 7/1988 | |
| JP | | 04055639 A * | 2/1992 | 165/249 |

* cited by examiner

*Primary Examiner*—Robert A Hopkins
(74) *Attorney, Agent, or Firm*—Cox Smith Matthews Incorporated

(57) ABSTRACT

An apparatus for maintaining a desired air pressure inside a home includes a differential pressure switch/gage having a first port and a second port. The first port is adaptable for sensing a first pressure inside the home; the second port is adaptable for sensing a second pressure outside the home. The differential pressure switch/gage is adaptable for producing a signal in response to a difference between the first pressure and the second pressure. A motorized damper is in signal communication with the differential pressure switch/gage and is operable to control entry of air into the home in response to the signal. A method of maintaining a desired air pressure inside a home comprises sensing a first pressure inside the home, sensing a second pressure outside the home, and introducing air into the home through a controlled opening if said second pressure exceeds said first pressure by a specified amount.

16 Claims, 7 Drawing Sheets

METHOD AND APPARATUS FOR MAINTAINING A DESIRED AIR PRESSURE IN A HOME

CROSS-REFERENCE TO RELATED APPLICATIONS

This application claims the benefit of U.S. Provisional Patent Application Ser. No. 60/601,908 filed Aug. 16, 2004.

BACKGROUND

The present application relates generally to the field of residential heating, ventilating, and air conditioning ("HVAC"). Residential energy construction codes require houses to be extremely airtight. During the operation of common home appliances such as clothes dryers, kitchen and bath exhaust fans, and fireplaces, air is removed from the interior of a residential building, resulting in a negative pressure gradient between the interior and the exterior of the building. Under those conditions, large amounts of outdoor air containing dusts, pollens, and other pollutants will be drawn into a home any time a door, window, or other air passage is opened to the exterior. There is a need for an inexpensive, simple solution to this problem.

SUMMARY

An apparatus for maintaining a desired air pressure inside a home includes a differential pressure switch/gage having a first port and a second port. The first port is adaptable for sensing a first pressure inside the home; the second port is adaptable for sensing a second pressure outside the home. The differential pressure switch/gage is adaptable for producing a signal in response to a difference between the first pressure and the second pressure. A motorized damper is in signal communication with the differential pressure switch/gage and is operable to control entry of air into the home in response to the signal. A method of maintaining a desired air pressure inside a home comprises sensing a first pressure inside the home, sensing a second pressure outside the home, and introducing air into the home through a controlled opening if said second pressure exceeds said first pressure by a specified amount.

BRIEF DESCRIPTION OF THE DRAWINGS

In the drawings, wherein like numerals refer to like parts throughout.

DETAILED DESCRIPTION

Figure 1:
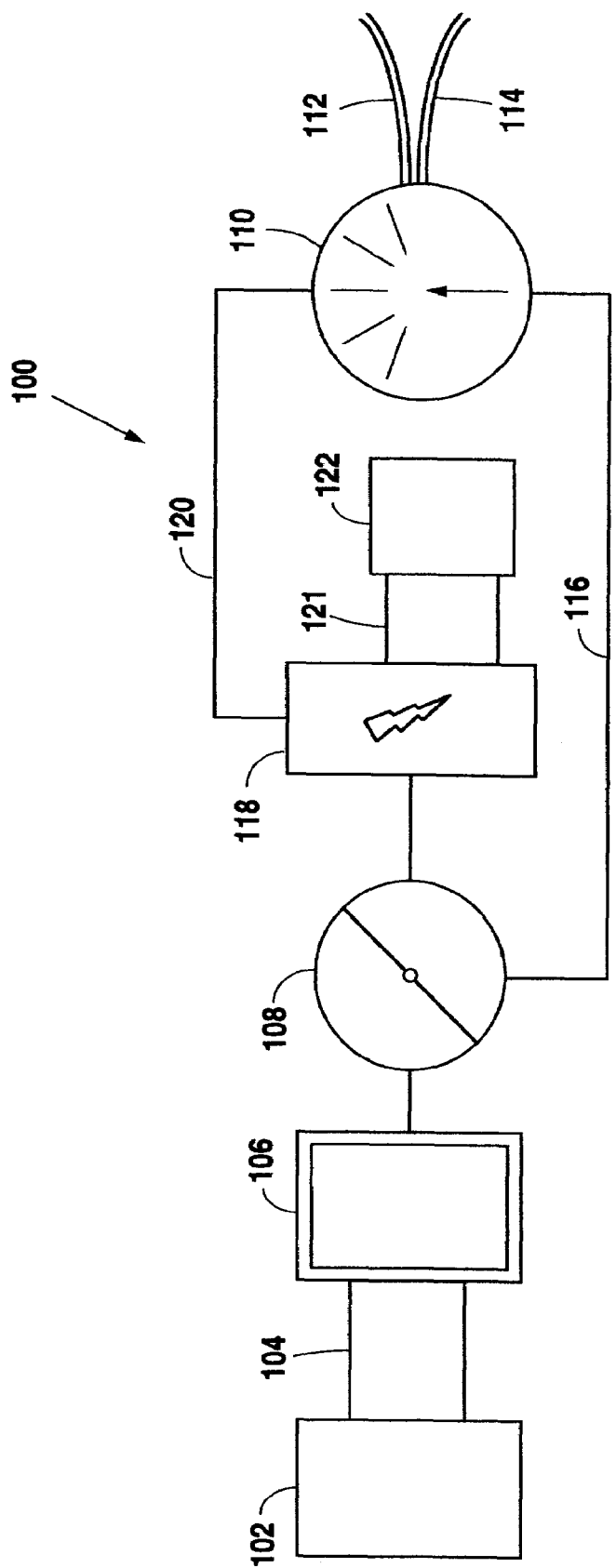
FIG. 1 is a schematic diagram of a controlled air infiltration system.

As used herein, the following terms should be understood to have the indicated meanings:

"Air flow communication" means a condition in which air is permitted to flow from one location to another location. Air flow communication between two identified locations or items may be direct or indirect and may or may not involve intermediate locations or items between the two identified locations or items.

"Air purifier" means any device that is effective to reduce or eliminate one or more contaminants in air. An air purifier may include but is not limited to an ultraviolet ("UV") light, an ozonation device, or a combination thereof.

"Contaminant" means any substance that is harmful or potentially harmful when breathed by humans or animals, including but not limited to bacteria, mold spores, and viruses.

"Differential pressure switch/gage" means any device that is capable of sensing a first pressure and a second pressure and producing a signal in response to a difference between the first pressure and the second pressure. A differential pressure switch/gage may be a unitary device or may be separable into two or more components. For example, a differential pressure switch/gage may have one or more components that sense the first and second pressures and one or more components that produce the signal.

"DPDT" means dual pole, dual throw.

"Filter" means any device that is capable of removing particles from air, whether by physical straining, electrostatic charges, or otherwise.

"Home" means a residential building.

"Motorized damper" means any device that is capable of partially or completely opening and closing an aperture to control the flow of air. A motorized damper may have any suitable manner of operation, including but not limited to electrical, hydraulic, or other type of operation.

"Signal communication" means any mode of signal transmission, whether electrical, optical, or otherwise. Signal communication between two identified items may be direct or indirect and may or may not involve intermediate items between the two identified items.

Referring generally to the drawings and particularly to FIGS. 1 and 3-6, in a controlled home air infiltration system 100, air enters the system 100 through an opening 102 to the exterior of the home. Opening 102 may be sized based on the total possible air discharge capability (e.g., in cubic feet per minute) from all appliances, exhaust fans, and other devices that discharge air from the home. The opening 102 may be connected to the system 100 by a flexible air duct 104 or other suitable conduit. The system 100 includes a filter assembly 106 having a filter through which air entering the system 100 may be filtered to remove contaminants. The filter may or may not be removable from system 100. Filter assembly 106 may be located upstream from a motorized damper 108 that is normally closed. Alternatively, filter assembly 106 may be located downstream from damper 108. The incoming air may also be treated by an air purifier 118, which may include but is not limited to ultraviolet ("UV") light, ozonation, or other sterilization devices, to eliminate or reduce bacteria, mold spores, viruses, and other contaminants. Persons of ordinary skill in the art will recognize that one or more air filters and air purifiers may be used alone or in combination and in any order with respect to each other and the damper 108.

The opening of the damper 108 is controlled by a differential pressure switch/gage 110, which is in signal communication with damper 108. A suitable pressure switch/gage 110 is a photohelic pressure switch/gage Model 3000-00AV available from Dwyer Instruments, Inc., Michigan City, Ind., as described in U.S. Pat. No. 3,862,416, which is incorporated herein by reference. A suitable damper 108 is a Duro Zone™

Model RD10 Part No. 35043 damper, available from Duro Dyne Corp., Bay Shore, N.Y. Such an off-the-shelf pressure switch/gage 110 and damper 108 are readily available, relatively inexpensive, and suitable for serving a typical home having approximately 3,000 ft² of living space and having an optimal air flow rate of up to about 450 ft³/minute. Of course, other suitable dampers and pressure switch/gages may be used to accommodate any size of home and any desired air flow rate.

Figure 3:
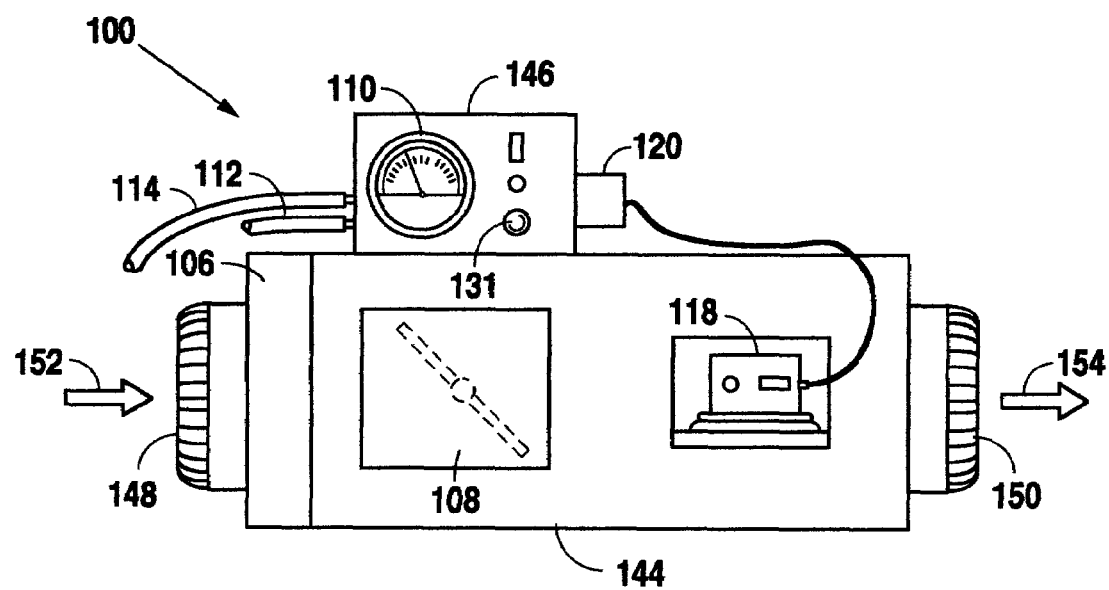
FIG. 3 is a side view of an embodiment of a controlled air infiltration system.
Figure 4:
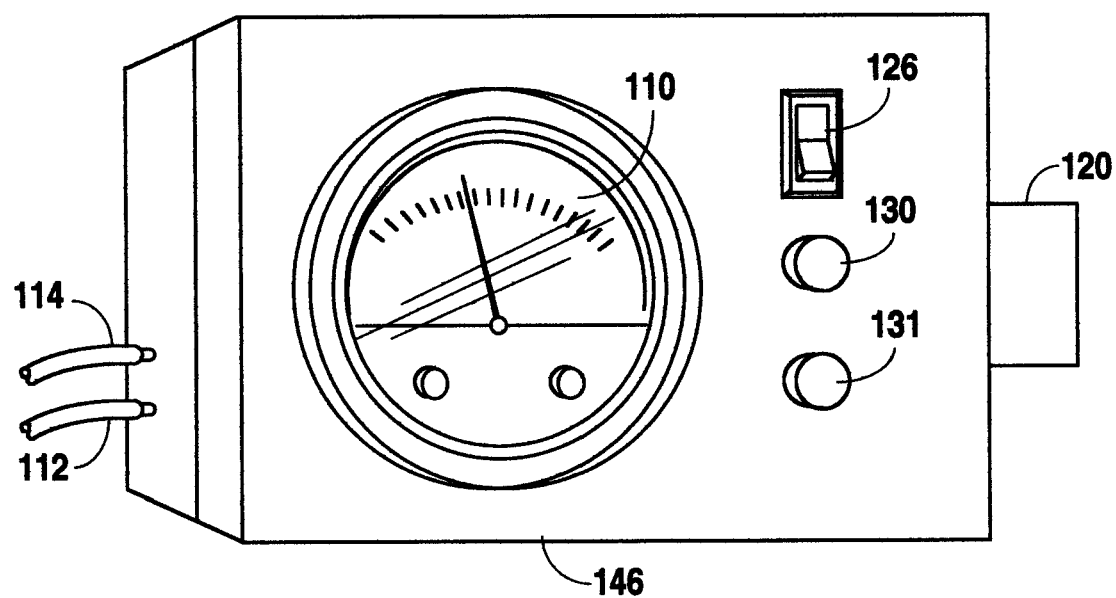
FIG. 4 is a close-up view of the differential pressure switch of FIG. 3.
Figure 5:
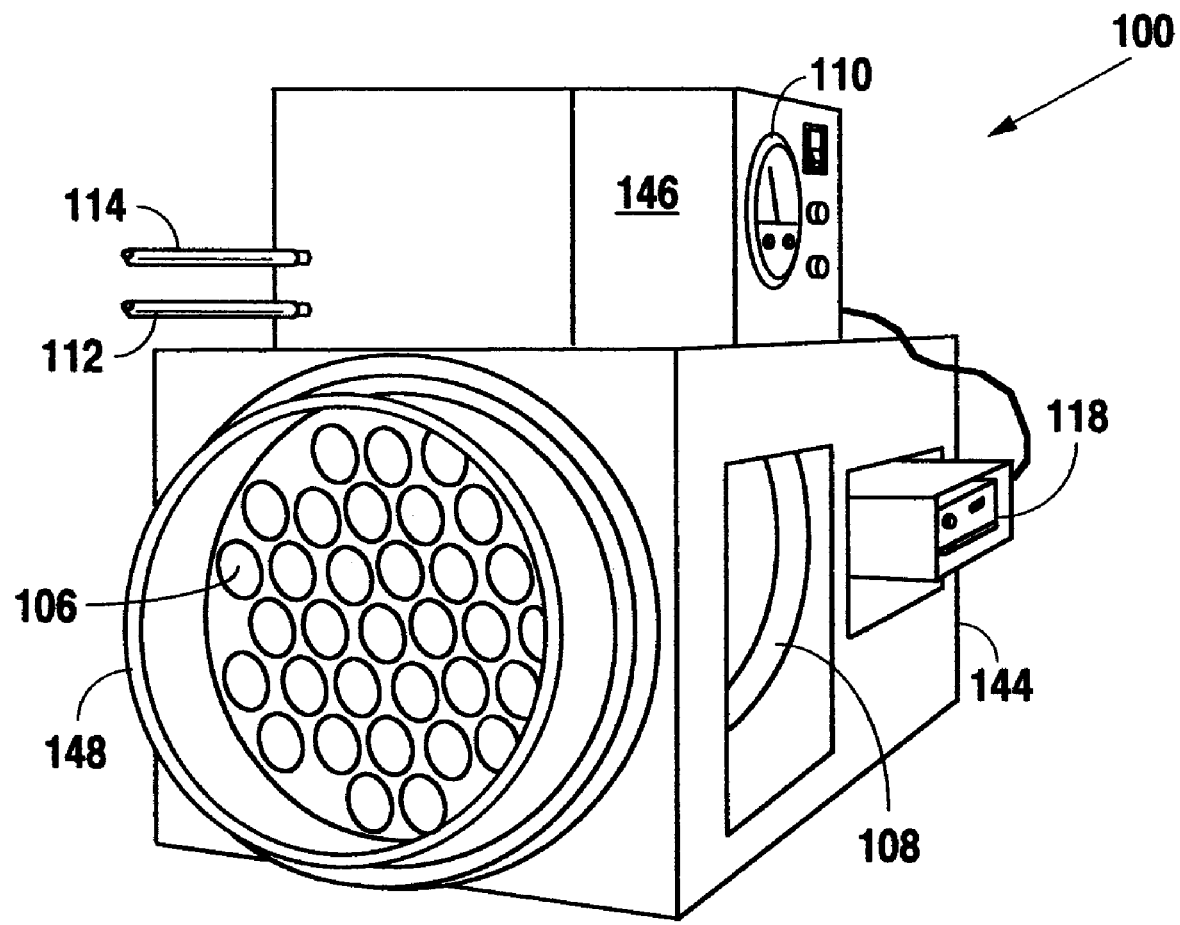
FIG. 5 is a perspective view of the inlet end of the system of FIG. 3.
Figure 6:
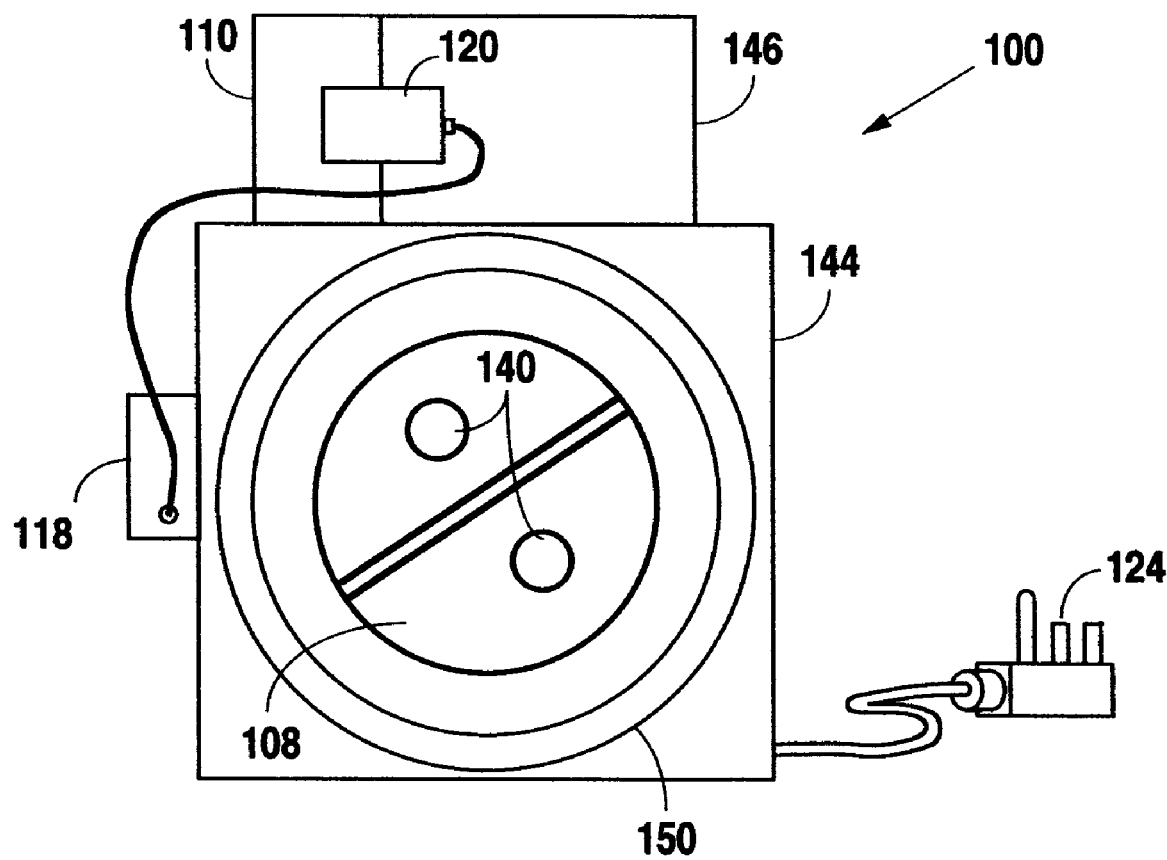
FIG. 6 is an end view of the outlet end of the system of FIG. 3.

System 100 may be assembled as a compact, self-contained unit with housings 144 and 146 as shown in FIGS. 3-6, which may be easily installed between opening 102 and the home's HVAC system. In the illustrated embodiment, housing 144 provides a suitable mounting for filter 106, damper 108, and air purifier 118, and housing 146 provides a suitable mounting for pressure switch/gage 110, lights 130 and 131, on/off switch 126, power outlet 120, and pressure sensing tubes 112 and 114. Housings 144 and 146 may be joined together, if desired, or they may constitute a single housing. Of course, other suitable housing arrangements could be made, or no housings may be used. A fitting 148 may be provided to connect the upstream end of system 100 to opening 102 via duct 104, and a fitting 150 may be provided to connect the downstream end of system 100 to the home's HVAC system, e.g., return air plenum 122, via another duct (not shown). As shown in FIG. 3, air enters system 100 as indicated by arrow 152, passes through filter 106, damper 108, and air purifier 118, and exits system 100 as indicated by arrow 154. Thus, as illustrated in FIGS. 3, 5 and 6, the housing 144 forms a substantially linear passageway between fittings 148 and 150, with filter 106, damper 108, and air purifier 118 intermediate fittings 148 and 150. The pressure switch/gage 110 is connected to pressure sensing tubes 112 and 114, which are used to monitor air pressure outside and inside the home, respectively. As the air pressure in the home is reduced by a specified amount, such as 0.005 inch of water column, for example, relative to the outside atmospheric pressure due to the discharge of air from the home as a result of the operation of appliances, exhaust fans, and other devices within the home, the pressure switch/gage 110 senses the pressure differential and sends a signal to activate a power supply 116 to the motorized damper 108, causing the damper 108 to open and allow exterior air to enter the home through system 100. Air passing through the damper 108 may be routed through an air purifier 118. Activation of the power outlet 120 to the air purifier 118 may also be controlled by the pressure switch/gage 110. The air purifier 118 may also be connected by an air duct 121 to the HVAC system return air plenum 122, allowing its use to continuously condition interior air.

Figure 2:
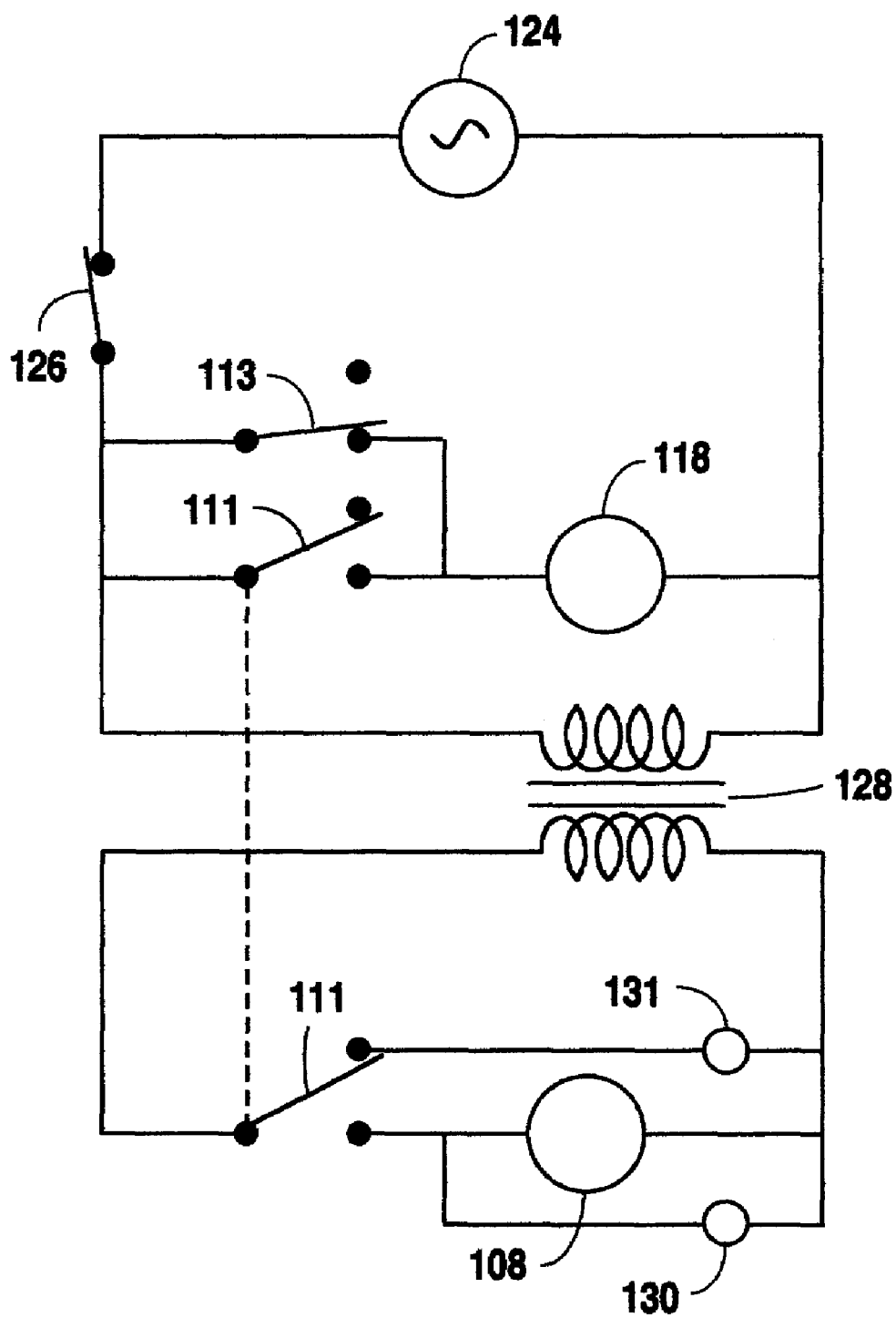
FIG. 2 is a simplified schematic wiring diagram illustrating the connection of the pressure switch/gage to the motorized damper and air purifier of FIG. 1.
Figure 7:
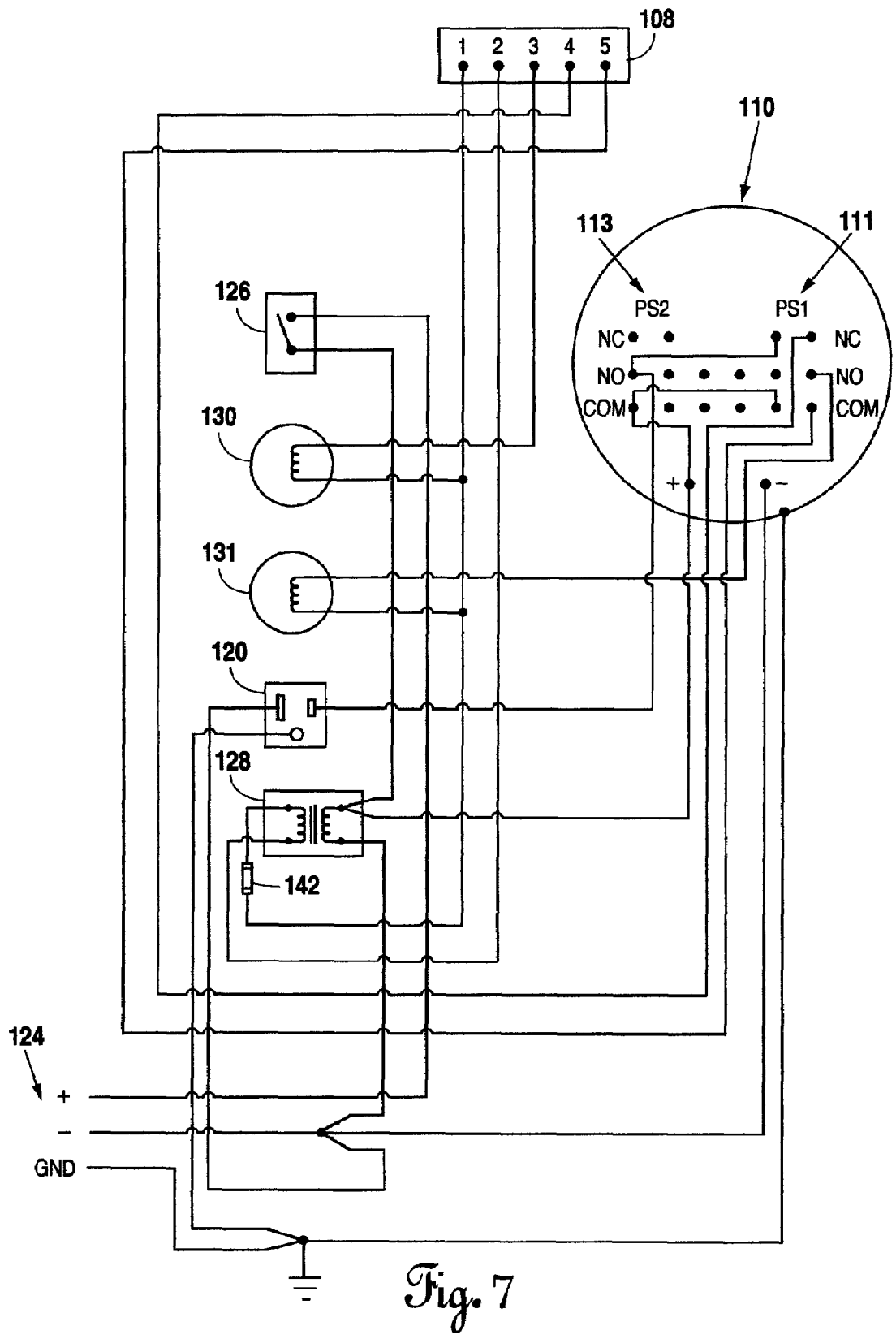
FIG. 7 is a detailed wiring diagram of the system of FIG. 3.

The connection of the pressure switch/gage 110 to the motorized damper 108 in one illustrated embodiment is shown in FIGS. 2 and 7. The system 100 may be provided with 120 V A/C electrical power, for example, via a connection 124 to a standard power outlet found in most residential buildings. Of course, system 100 may be designed to function in accordance with any desirable power source. The system 100 may be operational whenever an on/off switch 126 located on the front panel of the device (see FIG. 4) is in the closed position. In the illustrated embodiment, pressure switch/gage 110 includes a differential pressure gage with two DPDT pressure contact switches 111, 113 and both high and low set points. The pressure switch/gage 110 may be configured such that the pressure sensing tube 114 communicating with the inside of the house is connected to the low pressure connection port on the gage, and the pressure sensing tube 112 communicating with the outside of the house is connected to the high pressure connection port on the gage. The needle representing the high set point on the pressure switch/gage 110 may be set to a level such that whenever the pressure outside the house exceeds the pressure inside the house by a specified amount, the high pressure switch contacts 111 will permit 120 V A/C current to flow to the air purifier 118 and to a 120 V A/C to 24 V A/C transformer 128. The air purifier 118 is not shown in FIG. 7 for the sake of simplicity. A fuse 142 may be provided to protect system 100 against power surges. The transformer 128 provides 24 V A/C current to the motorized damper 108, causing it to open and allow exterior air to enter the building through system 100. Conversely, as the interior air pressure rises such that the exterior pressure no longer exceeds the interior pressure by the specified amount, the high pressure switch contacts 111 will cut the flow of current to the motorized damper 108 and cause it to close. The needle representing the low set point on the pressure switch/gage 110 may be set to a level such that whenever the air pressure inside the building exceeds the pressure outside the building by a specified amount, the low pressure switch contacts 113 will permit 120 V A/C current to flow to the air purifier 118. This feature allows the air purifier 118 to operate whenever the HVAC system inside the building is also in operation.

Referring to FIGS. 2, 4 and 7, the status of the damper 108 may be signified by a green light 130 and a red light 131 located on the front panel of the apparatus. The green light 130 may be wired to glow when the damper 108 is open, and the red light 131 may be wired to glow when the damper 108 is closed, for example. Of course, other indicators may also be employed to indicate the status of various components of system 100.

Referring to FIG. 6, the damper 108 may be provided with one or more sub-dampers 140, which may be adjustable openings that may be manually set to allow a small amount of air to enter the home when the HVAC system is not running so that the air in the home does not become too stale. Of course, sub-dampers 140 could be set automatically rather than manually, if desired. As with damper 108, sub-dampers 140 may be sized to allow a desired amount of airflow according to methods known in the art.

Persons of ordinary skill in the art will recognize that system 100 will maintain the pressure of the interior of a home at or slightly above the atmospheric pressure outside the home as appliances or other devices discharge air from the home. The present system thus facilitates a cleaner and healthier home by preventing the influx of dusty, contaminated air when exterior doors and windows are opened as would occur if a negative pressure gradient were present. Moreover, the present system may be installed in a home at roughly 50-60% of the cost of a conventional air exchange system, which does not address the negative pressure gradient problem. The present system is relatively inexpensive and easy to install, operate, and maintain, and it reduces cleaning costs by admitting cleaner air into the home. The present system also reduces health care costs because the occupants of the home are less likely to become sick since they are breathing cleaner air.

Although various embodiments have been described herein, persons of ordinary skill in the art will recognize that many variations may be employed within the spirit and scope of the present invention as defined in the appended claims and considering the doctrine of equivalents. Therefore, this invention is not to be limited to the details shown and described herein.

What is claimed is:

1. An apparatus for maintaining a desired air pressure inside a home, the home having an HVAC system and an opening to the exterior of the home, said apparatus comprising:
   a housing having a first fitting and a second fitting and a substantially linear passageway between said first fitting and said second fitting;
   said first fitting being adaptable for placing said apparatus in air flow communication with the opening;
   said second fitting being adaptable for placing said apparatus in air flow communication with the HVAC system;
   a motorized damper connected to said housing;
   a differential pressure switch/gage in signal communication with said motorized damper;
   said differential pressure switch/gage having a first port and a second port;
   said first port being adaptable for sensing a first pressure inside the home;
   said second port being adaptable for sensing a second pressure outside the home;
   said differential pressure switch/gage being adaptable for producing a signal in response to a difference between said first pressure and said second pressure;
   said motorized damper being operable to admit air into the home through said passageway in response to said signal.

2. The apparatus of claim 1 further comprising an air purifier connected to said housing, wherein the air is purified by said air purifier.

3. The apparatus of claim 1 wherein said differential pressure switch/gage comprises a differential pressure gage having a first DPDT pressure contact switch, a second DPDT pressure contact switch, a high set point, and a low set point.

4. The apparatus of claim 3 wherein said high set point is settable to a level such that, if said second pressure exceeds said first pressure by a specified amount, said first DPDT pressure contact switch will cause said motorized damper to admit air into the home.

5. The apparatus of claim 4 wherein if said second pressure does not exceed said first pressure by a specified amount, said first DPDT pressure contact switch will cause said motorized damper not to admit air into the home.

6. The apparatus of claim 3 further comprising an air purifier in signal communication with said differential pressure switch/gage, wherein said low set point is settable to a level such that, if said first pressure exceeds said second pressure by a specified amount, said second DPDT pressure contact switch will cause said air purifier to operate.

7. The apparatus of claim 1 wherein said damper comprises one or more sub-dampers.

8. The apparatus of claim 7 wherein said one or more sub-dampers are adaptable to operate while said HVAC system is not running.

9. The apparatus of claim 8 wherein said sub-dampers are adapted to be set manually.

10. The apparatus of claim 8 wherein said sub-dampers are adapted to be set automatically.

11. The apparatus of claim 1 further comprising a filter disposed within said housing.

12. The apparatus of claim 11 wherein said filter is located upstream from said damper.

13. The apparatus of claim 2 wherein said air purifier comprises ultraviolet light.

14. The apparatus of claim 2 wherein said air purifier comprises an ozonation device.

15. An apparatus for maintaining a desired air pressure inside a home, the home having an HVAC system and an opening to the exterior of the home, said apparatus consisting essentially of:
   a housing having a first fitting and a second fitting;
   a substantially linear passageway between said first fitting and said second fitting;
   said first fitting being adaptable for placing said apparatus in air flow communication with the opening;
   said second fitting being adaptable for placing said apparatus in air flow communication with the HVAC system;
   a filter disposed within said housing intermediate said first fitting and said second fitting;
   a motorized damper disposed within said housing intermediate said first fitting and said second fitting;
   a differential pressure switch/gage mounted to said housing and in signal communication with said motorized damper;
   said differential pressure switch/gage having a first port and a second port;
   said first port being adaptable for sensing a first pressure inside the home;
   said second port being adaptable for sensing a second pressure outside the home;
   said differential pressure switch/gage being adaptable for producing a signal in response to a difference between said first pressure and said second pressure;
   said motorized damper being operable to admit air into the home through said passageway in response to said signal.

16. The apparatus of claim 15 further comprising an air purifier disposed within said housing intermediate said first fitting and said second fitting.

* * * * *